(12) United States Patent
Beattie, Jr.

(10) Patent No.: US 8,288,675 B2
(45) Date of Patent: *Oct. 16, 2012

(54) METHOD AND APPARATUS FOR FABRICATING AN ORTHOPAEDIC PROSTHETIC COMPONENT

(75) Inventor: Gerald William Beattie, Jr., Rochester, IN (US)

(73) Assignee: DePuy Products, Inc., Warsaw, IN (US)

( * ) Notice: Subject to any disclaimer, the term of this patent is extended or adjusted under 35 U.S.C. 154(b) by 1326 days.

This patent is subject to a terminal disclaimer.

(21) Appl. No.: 11/965,799

(22) Filed: Dec. 28, 2007

(65) Prior Publication Data

US 2009/0166337 A1    Jul. 2, 2009

(51) Int. Cl.
*B23H 9/00* (2006.01)
(52) U.S. Cl. .................. 219/69.12; 219/69.17
(58) Field of Classification Search .............. 219/69.17, 219/69.12, 69.11, 69.2
See application file for complete search history.

(56) References Cited

U.S. PATENT DOCUMENTS

| | | | |
|---|---|---|---|
| 4,547,646 A | 10/1985 | Briffod | |
| 4,743,729 A * | 5/1988 | Beal | 219/69.12 |
| 4,841,126 A * | 6/1989 | Graeber | 219/69.17 |
| 4,960,971 A * | 10/1990 | Kawanabe | 219/69.12 |
| 5,002,575 A * | 3/1991 | Johnson | 623/23.5 |
| 5,002,580 A | 3/1991 | Noble et al. | |
| 5,062,854 A | 11/1991 | Noble et al. | |
| 5,108,432 A | 4/1992 | Gustavson | |
| 5,147,408 A | 9/1992 | Noble et al. | |
| 5,683,396 A | 11/1997 | Tokish et al. | |
| 6,132,432 A | 10/2000 | Richelsoph | |
| 6,410,877 B1 * | 6/2002 | Dixon et al. | 219/69.17 |
| 6,503,251 B1 | 1/2003 | Shadduck | |
| 6,506,213 B1 | 1/2003 | Mandel et al. | |
| 6,840,937 B2 | 1/2005 | Van Wyk | |
| 6,932,821 B2 | 8/2005 | White | |
| 7,160,296 B2 | 1/2007 | Pearson et al. | |
| 7,208,222 B2 | 4/2007 | Rolfe et al. | |
| 2004/0199260 A1 * | 10/2004 | Pope et al. | 623/23.5 |
| 2008/0262626 A1 * | 10/2008 | Raugel | 623/22.15 |

FOREIGN PATENT DOCUMENTS

| | | |
|---|---|---|
| CA | 2247568 A1 * | 3/2000 |
| JP | 3178730 A | 8/1991 |

OTHER PUBLICATIONS

Qu et al., "Development of the Cylindrical Wire Electrical Discharge Machining Process, Part1: Concept, Design, and Material Removal Rate", Aug. 2002, Transactions of the ASME, vol. 124, pp. 702-707.*
Hirschmann catalog Re 2008, "Rotary Index Tables, A-axes, and rotating spindles for wire and sinking EDM", Dec. 2008, pp. 1-16.*

* cited by examiner

*Primary Examiner* — Geoffrey S Evans
(74) *Attorney, Agent, or Firm* — Barnes & Thornburg LLP (57) ABSTRACT

A method and apparatus for fabricating an orthopaedic prosthetic component includes rotating the orthopaedic prosthetic component and operating an electrical discharge machining cutting tool (EDM) to move a wire electrode of the EDM along an arcuate path. A spark is generated between the wire electrode and the orthopaedic prosthetic component to remove a portion of the orthopaedic prosthetic component.

19 Claims, 6 Drawing Sheets

METHOD AND APPARATUS FOR FABRICATING AN ORTHOPAEDIC PROSTHETIC COMPONENT

CROSS REFERENCE

Cross reference is made to copending U.S. patent application Ser. No. 11/965,796, pending, entitled "Method and System for Fabricating an Aspherical Orthopaedic Prosthetic Component" by Gerald W. Beattie, Jr., which is assigned to the same assignee as the present application and filed concurrently herewith. The entirety of the above-referenced application is hereby incorporated by reference.

TECHNICAL FIELD

The present disclosure relates generally to methods and systems for fabricating orthopaedic prosthetic components, and more particularly to methods and systems for fabricating orthopaedic prosthetic components having curved surfaces.

BACKGROUND

Joint arthroplasty is a well-known surgical procedure by which a diseased and/or damaged natural joint is replaced by a prosthetic joint. The orthopaedic prosthetic joint may include a number of components of various shapes and sizes. Some orthopaedic prosthetic components have a spherical shape or otherwise include a curved outer surface. For example, typical "ball-and-socket" prosthetic joints, such as hip and shoulder prosthetic joints, include a head component having a spherical shape, which is configured to be received in a corresponding cup component. Additionally, other orthopaedic prosthetic joint components may have other shapes having one or more curved outer surfaces.

Orthopaedic prosthetic components having a spherical shape or curved outer surface are typically manufactured using a multi-step lathing process. Because a lathe is limited in its ability to form curved surfaces with a work piece held in a single orientation, several lathing process steps using different component orientations are required to form the spherical shape or other curved surface. Additionally, because typical lathes are unable to form curved surfaces within the tolerances required for orthopaedic applications, a subsequent grinding process is required to form the spherical shape or curved surface within the tolerances required.

In addition to lathing processes, other manufacturing processes may be used to fabricate orthopaedic prosthetic components having spherical shapes. One such manufacturing process is electrical discharge machining (EDM). Electrical discharge machining may be used to machine materials that are electrically conductive. In electrical discharge machining, a potential difference is generated between an electrode, such as a wire electrode, of the electrical discharge machining tool and the work piece. The potential difference between the electrode and the work piece causes a spark to be generated. The spark erodes a portion of the work piece, and consecutive sparks between the electrode and work piece are used to remove material from the work piece. Because the electrode may also be damaged by the spark, the electrode is continuously replaced. For example, in electrical discharge machining using wire electrodes, the electrode wire is continuously advanced while the work piece is being fabricated.

The work piece may be shaped by moving the electrode and/or the work piece itself. Additionally, spherical shapes may be formed using electrical discharge machining by rotating the work piece while the electrode is moved along an arc. For example, a typical EDM includes a positioning motor to which the work piece is coupled. The positioning motor is used to slowly move the work piece while the wire electrode is moved along an arc. The adaptive feedback control used to cut the work piece is based, in part, on the speed and position of the work piece positioning motor. Typical positioning motors operate at about 1-2 revolutions per minute. At such rotational speeds, fabrication of orthopaedic components using a typical electrical discharge machining process take about four to five days to complete.

SUMMARY

According to one aspect, a method for fabricating an orthopaedic prosthetic component may include rotating the orthopaedic prosthetic component. In some embodiments, the orthopaedic prosthetic component may be rotated at a speed greater than about 100 revolutions-per-minute. For example, in some embodiments, the orthopaedic prosthetic component may be rotated at a speed of about 200 revolutions-per-minute. The orthopaedic prosthetic component may be, for example, a modular head component of a hip or shoulder prosthesis.

The method may also include operating an electrical discharge machining tool to move a wire electrode of the electrical discharge machining tool along an arcuate path. Additionally, the method may include generating a spark between the wire electrode and the orthopaedic prosthetic component to remove a portion of the orthopaedic prosthetic component. The spark may be generated to remove a portion of the orthopaedic prosthetic component to form a curved surface of the orthopaedic prosthetic component. For example, the spark may be generated to remove a portion of the orthopaedic prosthetic component to form a substantially spherical outer surface of the orthopaedic prosthetic component.

In some embodiments, the orthopaedic prosthetic component may be rotated in a first plane and the wire electrode of the electrical discharge machining tool may be moved along the arcuate path defined in a second plane substantially orthogonal to the first plane. Additionally, in some embodiments, the method may include advancing the wire electrode along the arcuate path without adaptive feedback relating to the rotary speed of the orthopaedic prosthetic component. The method may also include lathing the orthopaedic prosthetic component prior to the rotating step.

According to another aspect, a method for fabricating an orthopaedic prosthetic component, such as a modular head of a hip or shoulder prosthesis, may include rotating the orthopaedic prosthetic component and operating an electrical discharge machining tool. The orthopaedic prosthetic component may be rotated at a speed of about 200 revolutions-per-minute in some embodiments. Operating the electrical discharge machining tool may include operating an electrical discharge machining tool to advance a wire electrode of the electrical discharge machining tool along an arcuate cutting path without adaptive feedback relating to the rotary speed of the orthopaedic prosthetic component. A spark is generated between the wire electrode and the orthopaedic prosthetic component to remove a portion of the orthopaedic prosthetic component. For example, the spark may be generated to remove a portion of the orthopaedic prosthetic component to form a substantially spherical outer surface of the orthopaedic prosthetic component.

In some embodiments, the orthopaedic prosthetic component may be rotated in a first plane and the wire electrode of the electrical discharge machining tool may be moved along the arcuate path defined in a second plane substantially orthogonal to the first plane. The method may also include lathing the orthopaedic prosthetic component prior to the rotating step.

According to a further aspect, a system for fabricating an orthopaedic prosthetic component may include an electrical discharge machining tool. In some embodiments, the electrical discharge machining tool may be configured to advance a wire electrode of the electrical discharge machining tool along an arcuate cutting path without adaptive feedback relating to the rotary speed of the orthopaedic prosthetic component. The system may also include a motor coupled to the electrical discharge machining tool. The motor may include a mechanism configured to secure the orthopaedic prosthetic component to the motor. The motor may also be configured to rotate the orthopaedic prosthetic component at a speed greater than about 100 revolutions-per-minute. For example, the motor may be configured to rotate the orthopaedic prosthetic component at a speed of about 200 revolutions-per-minute

BRIEF DESCRIPTION OF THE DRAWINGS

The detailed description particularly refers to the following figures, in which.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Figure 1:
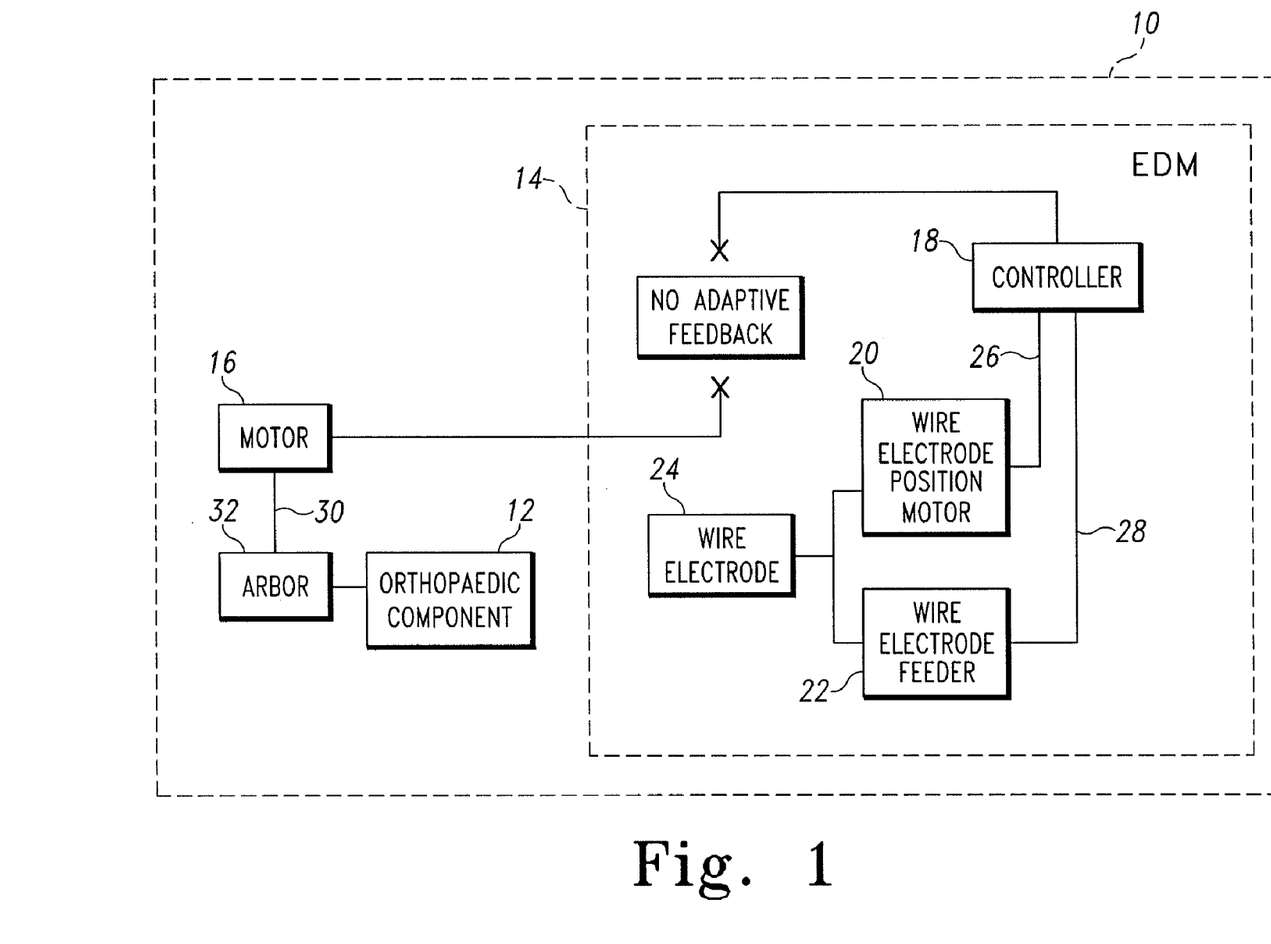
FIG. 1 is a simplified block diagram of a system for fabricating an orthopaedic prosthesis component.

Referring to FIG. 1, there is shown a system 10 for fabricating an orthopaedic prosthetic component 12. The system 10 may be used to fabricate orthopaedic prosthetic components 12 having a spherical shape and/or a curved outer surface. For example, the system 10 may be used to fabricate a modular head of a hip prosthesis or shoulder prosthesis, which typically has a spherical or near-spherical shape. In the illustrative embodiments described herein, the orthopaedic prosthetic components are made of a biocompatible metal, such as cobalt-chrome alloy, although other types of biocompatible metals may also be used. In addition to biocompatible metals, other types of biocompatible materials may also be used provided such materials are electrically conductive.

The system 10 may be used to fabricate an orthopaedic prosthetic component, a near net-shape orthopaedic prosthetic component, or net-shape orthopaedic prosthetic component from a starting component preform that has been previously subjected to an initial lathing operation, by obtaining such a component preform and machining it with an electrical discharge machine. What is meant herein by the term "component preform" is a work piece that has been subjected to an initial machining operation, such as lathing, to produce certain of the features associated with an orthopaedic prosthetic component. For example, a component preform may be a metallic work piece that has a tapered hole defined therein from a previous lathing process, with the remaining features of the orthopaedic prosthetic component to be formed in the work piece by the system 10. What is meant herein by the term "net-shape orthopaedic prosthetic component" is an orthopaedic prosthetic component that is in a shape or condition that is satisfactory for use in a prosthetic implant upon removal of the component from the electrical discharge machine without requiring any additional machining. The term "near net-shape orthopaedic prosthetic component", on the other hand, is meant herein to define a prosthetic component which requires a small degree of further manipulation, such as grinding or polishing, to produce the final component. What is meant herein by the term "orthopaedic prosthetic component" is an orthopaedic prosthetic component of any type, condition, shape, or configuration. As such, the term "orthopaedic prosthetic component", amongst others, includes component preforms, net-shape orthopaedic prosthetic components, and near net-shape orthopaedic prosthetic components.

The system 10 includes an electrical discharge machining tool 14 (hereinafter "EDM") and a rotating motor 16. In the illustrative embodiment described herein, the EDM 14 is embodied as a wire electrode electrical discharge machining cutting tool (WEDM). However, in other embodiments, other types of electrical discharge machining tools may be used. The EDM 14 includes a controller 18, a wire electrode positioning motor 20, a wire electrode feeder 22, and a wire electrode 24. The controller 18 is communicatively coupled to the wire electrode position motor 20 via a number of signal paths 26 and to the wire electrode feeder 22 via a number of signal paths 28. The signal paths 26, 28 may be embodied as any number of cables, wires, printed circuit board traces, and/or other interconnects capable of facilitating communication between the controller 18 and the wire electrode position motor 20 and the wire electrode feeder 22, respectively.

The EDM 14 may be embodied as any type of commercially available EDM, although, as described below, modifications are made to such machines. One such commercially available EDM is a model number AQ327L EDM which is commercially available from Sodick, Incorporated of Schaumburg, Ill. The EDM 14 has been altered from its commercially-available configuration. Specifically, the EDM 14 does not include adaptive feedback control from the EDM's work piece positioning motor to the controller 18. Specifically, as shown in FIG. 1, the EDM 14 does not utilize adaptive feedback control from the EDM's work piece positioning mechanism. That is, in typical EDM's, the controller utilizes adaptive feedback from the work piece positioning mechanism to control the cutting process. In such embodiments, the adaptive feedback control is configured for use with very slow rotational speeds of the work piece (e.g., 1-2 revolutions per minute) by the work piece positioning motor. However, in the illustrative embodiment described herein, the conventional work piece positioning motor is not utilized in lieu of the relatively high-speed motor 16. Specifically, in the illustrative embodiment, the motor 16 is utilized to rotate the prosthetic orthopaedic component at much higher rotational speeds (e.g., greater than 100 revolutions per minute) relative to those speeds that would be achievable with a conventional, unmodified EDM. The adaptive feedback control relating to the speed at which the work piece is rotated is removed or otherwise disabled in embodiments using such high rotational speeds. Specifically, as diagrammatically shown in FIG. 1, the cutting process is performed without adaptive feedback relating to the speed of the motor 16. In such a case, the speed at which the work piece is rotated (i.e., the speed of the motor 16) is set at a predetermined speed.

The motor 16 is used to rotate the work piece (i.e., the orthopaedic prosthetic component 12) relative to the EDM's cutting wire electrode 24. As described above, commercially available EDM's typically include a work-piece positioning mechanism having a low-speed motor for rotating the work piece at relatively low speeds (1-2 RPM). However, the system 10 of the illustrative embodiment does not utilize such a low-speed motor, but rather has been retrofitted with a high-speed motor to rotate the orthopaedic prosthetic component at speeds in excess of 100 RPM. In the illustrative embodiment described herein, the motor 16 may be embodied as a model number 3R-6.600-VHS rotating spindle which is commercially available from System 3R USA, Incorporated of Elk Grove Village, Ill. The motor 16 has an output shaft 30 which includes a coupling mechanism 32, such as an arbor or a chuck, for coupling the work piece (i.e., the orthopaedic prosthetic component) to the output of the motor 16.

Figure 2:
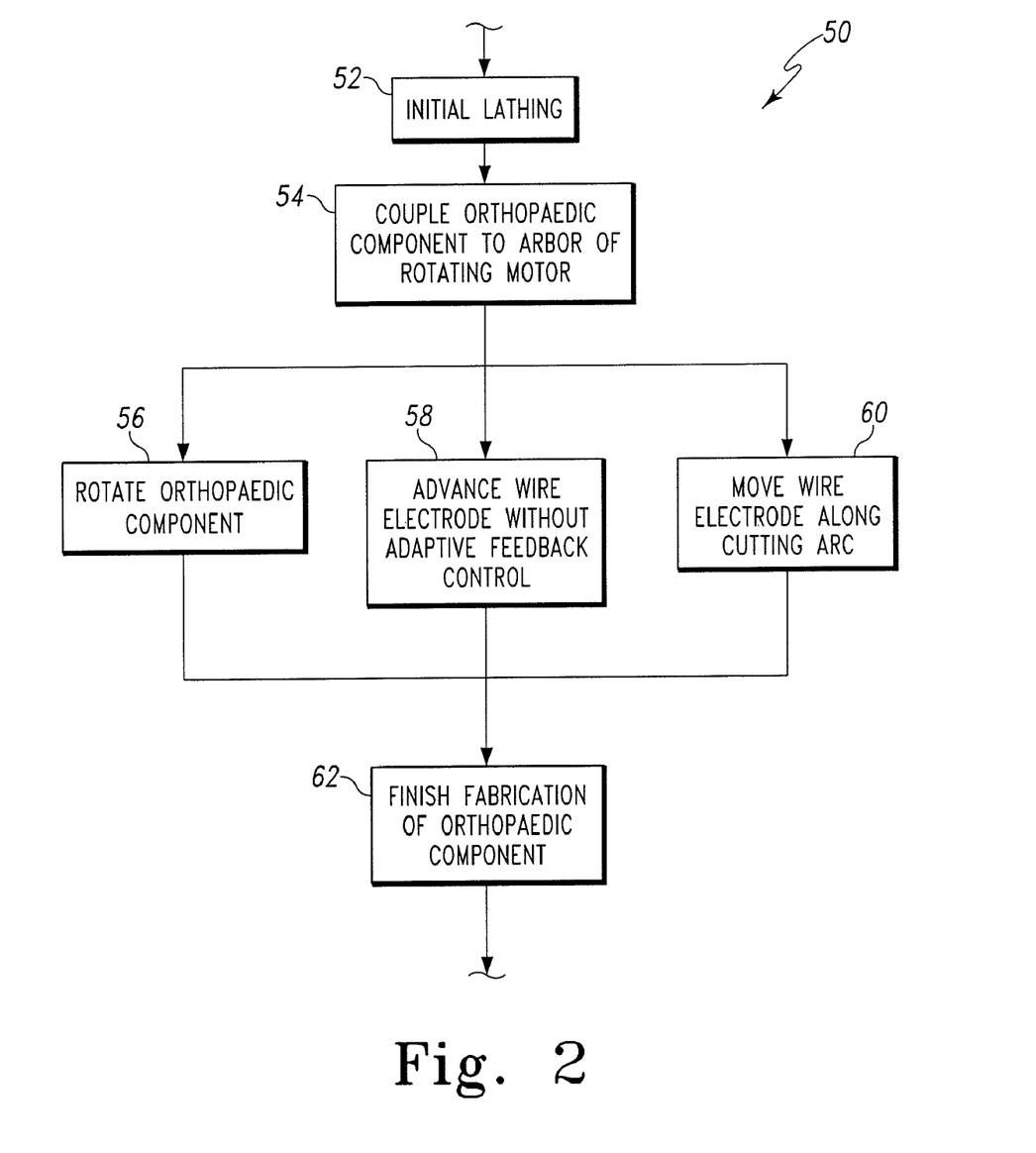
FIG. 2 is a simplified flow diagram of a method for fabricating an orthopaedic prosthetic component.
Figure 3:
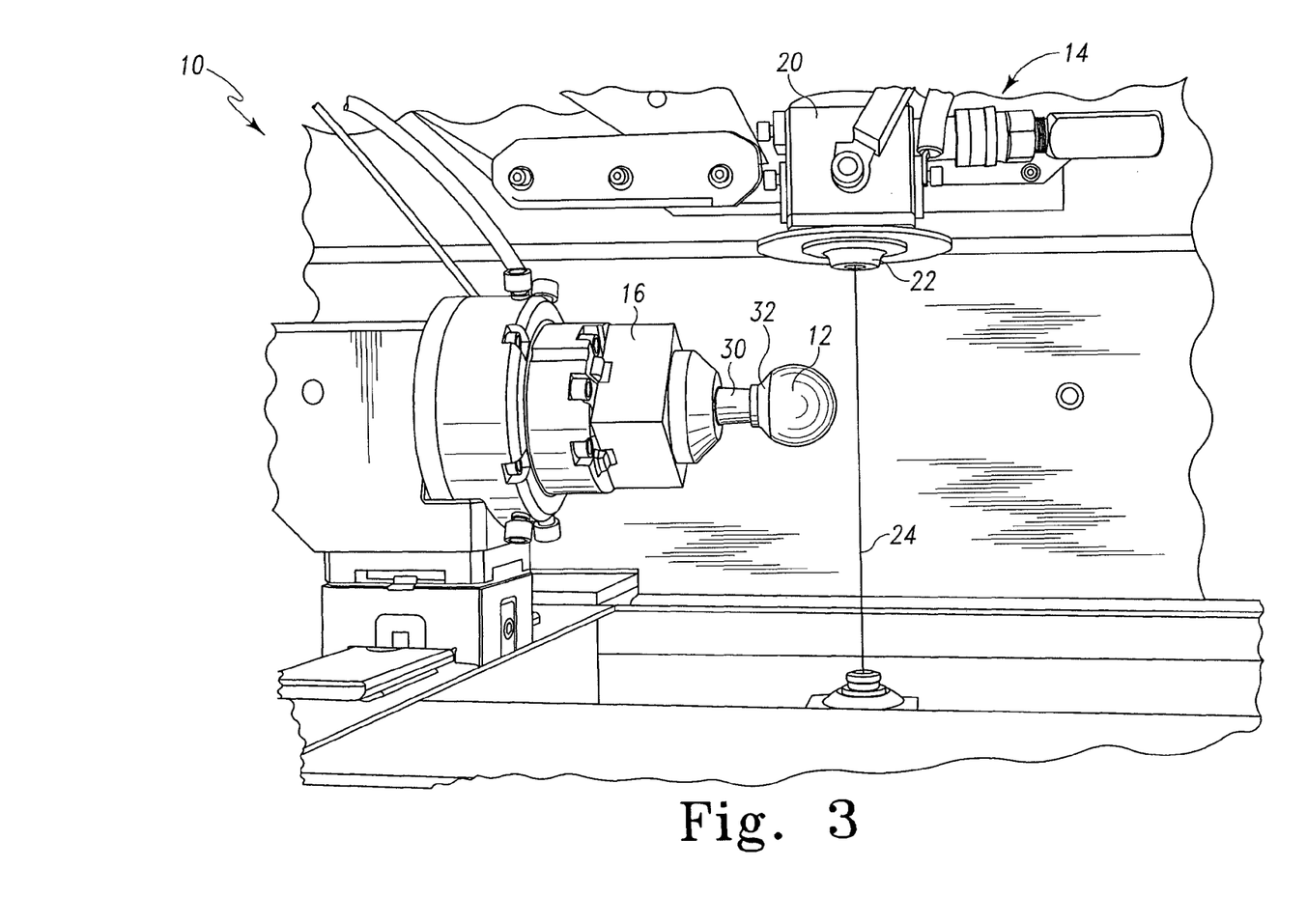
FIG. 3 is side perspective view showing the orthopaedic prosthetic component being fabricated by electrical discharge machining.
Figure 4:
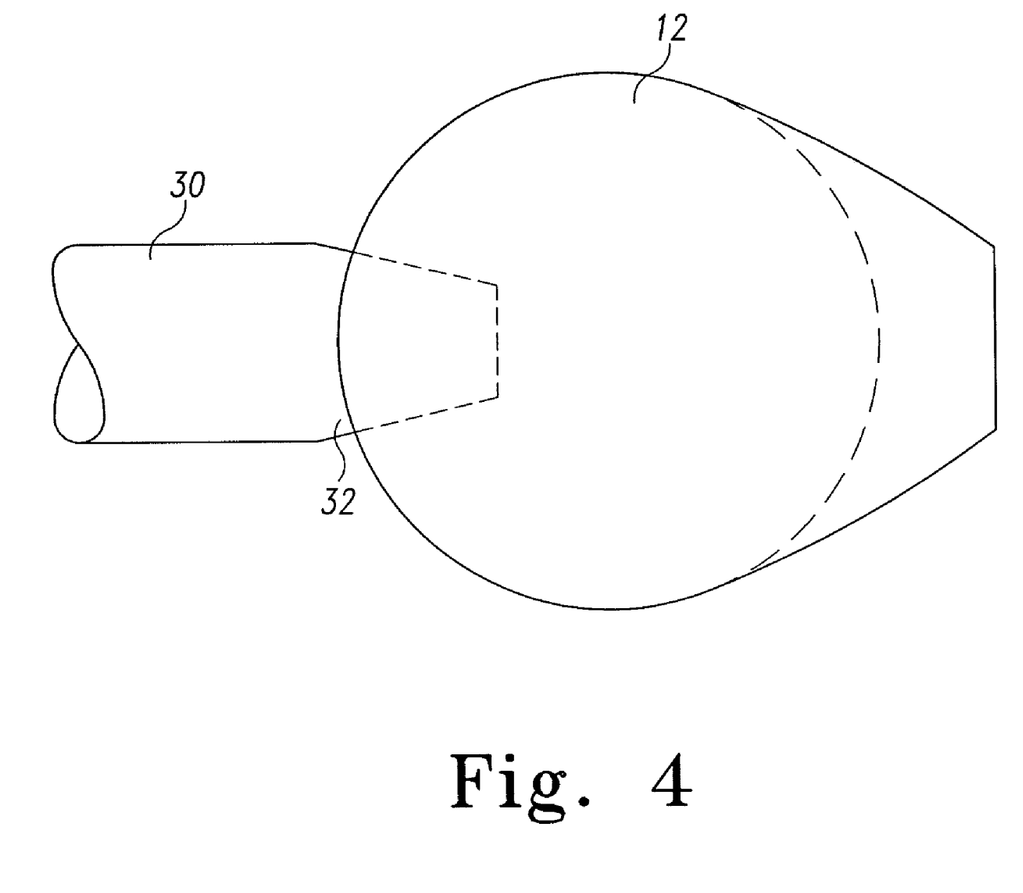
FIG. 4 is side elevation view of an orthopaedic prosthetic component after initial lathing but prior to electrical discharge machining.

Referring now to FIG. 2, a process 50 for fabricating an orthopaedic prosthetic component is shown. The process 50 begins with step 52 in which an initial lathing process is performed on a work piece to form an initial component preform. An illustrative component preform is shown in FIG. 4. In this case, the work piece has been lathed into a configuration in which certain of the features of the orthopaedic prosthetic component are present. For example, a tapered bore, such as a Morse tapered bore, has been formed in one side of the orthopaedic prosthetic component. The portion of the component into which the spherical surface of the head will be formed is also lathed into an initial shape. As shown in FIG. 4, the component preform will be further machined along the phantom line to form its final form. As will be described below in greater detail, such further machining will be performed with the EDM 14.

Once lathing of the component preform has been completed, the process 50 advances to step 54 during which the orthopaedic prosthetic component (e.g., a work piece in the form of a component preform) is secured to the output mechanism 32 of the rotating motor 16. Specifically, the component is secured to the chuck or arbor of the motor's output shaft 30 thereby allowing the component to be rotated by the motor 16.

As shown in FIG. 2, once the orthopaedic prosthetic component 12 has been secured to the output of the rotating motor 16, machining of the component 12 with the EDM 14 commences. Specifically, in step 56, the component 12 is rotated at a relatively high rotational speed. In the illustrative embodiment described herein, the component is rotated at a speed greater than 100 RPM. In other embodiments, even faster rotational speeds, including those in excess of 200 RPM, may be used.

Figure 5:
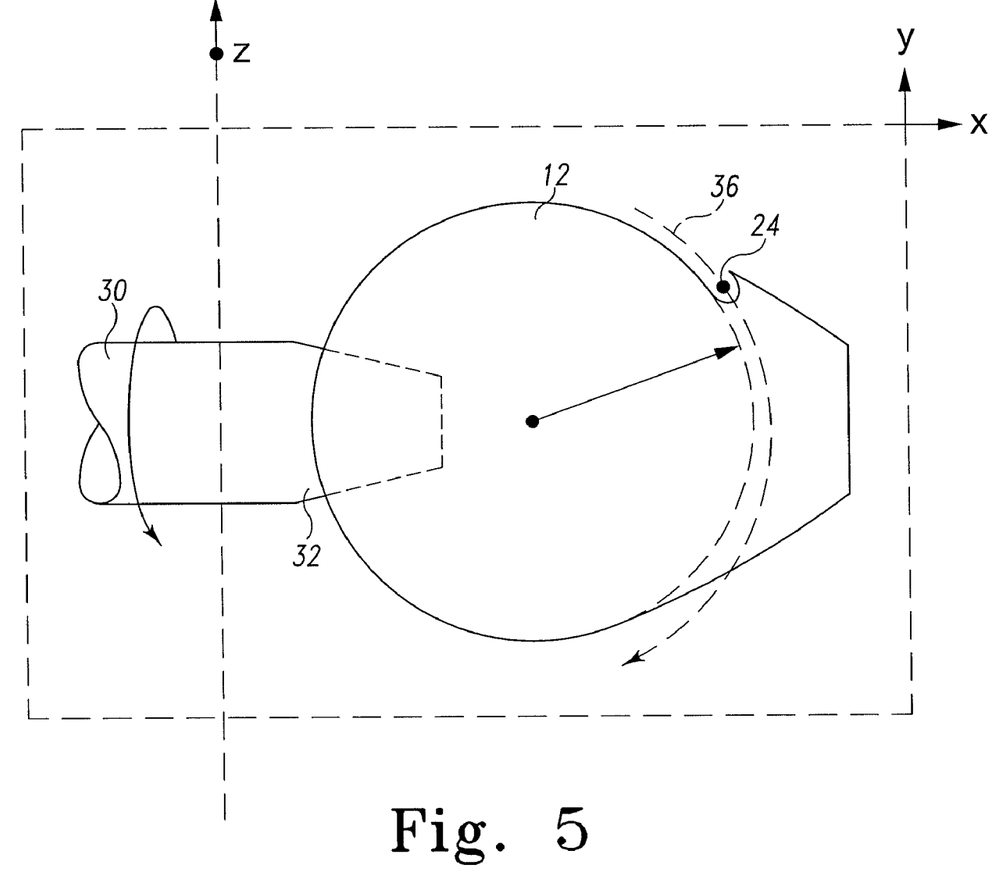
FIG. 5 is a top plan view of the orthopaedic prosthetic component during fabrication.
Figure 6:
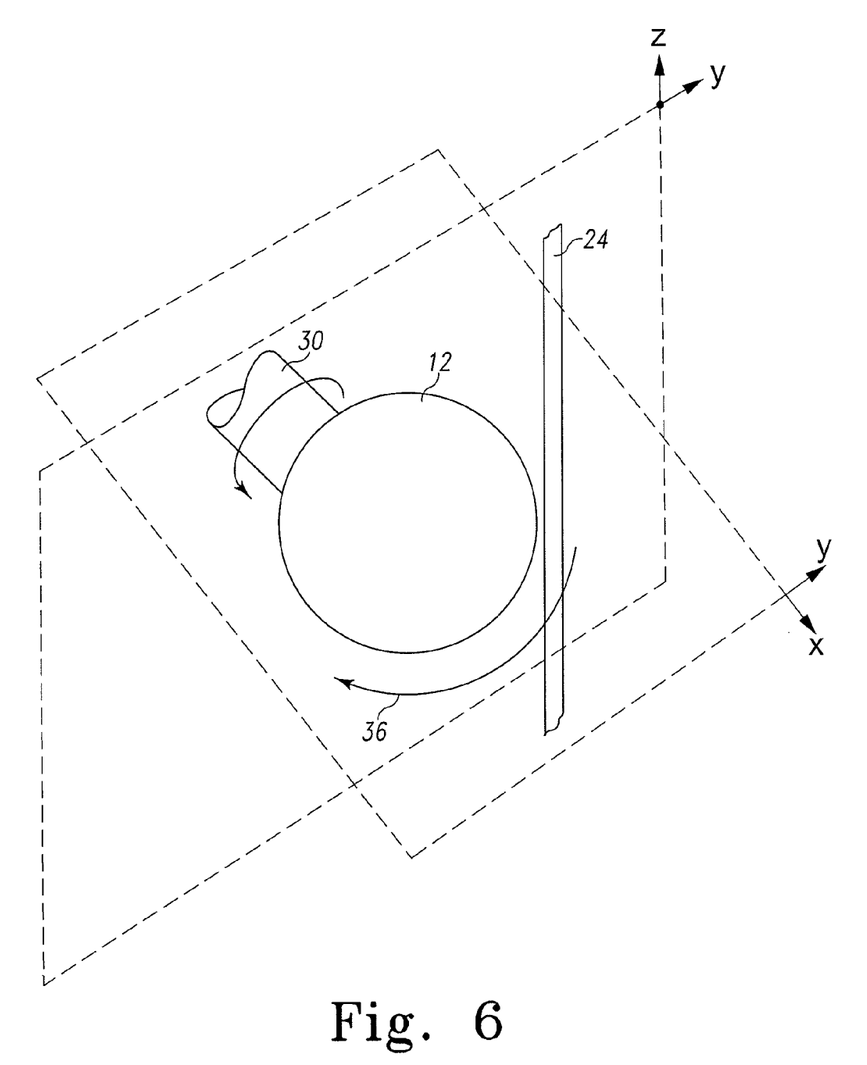
FIG. 6 is a perspective view of the orthopaedic prosthetic component during fabrication.

With the component 12 rotating, operation of the EDM 14 commences. Specifically, as shown in FIGS. 5 and 6, the controller 18 operates the wire position motor 20 to move the wire electrode 24 along a predetermined arcuate path to create a desired shape of the orthopaedic prosthetic component 12 (e.g., spherical). In the illustrative embodiment described herein, the wire electrode 24 is manipulated orthogonally relative to the wire electrode. In particular, as shown in FIG. 6, the orthopaedic prosthetic component 12 is rotated in one plane, while the wire electrode 24 is moved along an arcuate path 36 in another plane that is orthogonal to the plane in which the component 12 rotates. The wire electrode 24 may be moved through numerous different paths in numerous different planes to produce the desired shape of the component.

It should be appreciated that during such machining, the wire electrode 34 is guided along the desired path 36 or paths 36 and, as such, is positioned very closly to the orthopaedic prosthetic component 12, but it does not physically contact the component 12. Rather, sparks are generated between the wire electrode 24 and the orthopaedic prosthetic component 12. A consective number of such sparks produce a series of micro-craters on the component 12 thereby removing material along the cutting path 36 by melting and vaporization. The component 12 is continuously flushed with a dielectric cutting fluid to remove the particles created by such a process.

During such a process, similar micro-craters are formed on the surface of the wire electrode 24, with such debris likewise being flushed away by the cutting fluid. These micro-craters result in the gradual erosion of the wire electrode 24. As such, the wire electrode 24 is constantly replaced by feeding the wire 24 from a spool. In the illustrative embodiment described herein, the wire electrode 24 has a diameter of 0.25 μm, although other wire electrodes of other diameters may be used to fit the needs of a given system.

Conventional EDM wire advancing protocols rely on adaptive feedback to control the cutting process in which, amongst other things, output from the work piece positioning mechanism is utilized. However, such a methodology is not conducive to high-speed machining of the component 12. As such, in step 58, the controller 18 operates the motor 16 essentially in open-loop at a predetermined speed. In other words, the maching process is performed without adaptive feedback relating to the speed of the motor 16. Unexpectedly, it has been found that by doing so, the limitations on high-speed machining imposed by typical closed-loop EDM work-piece-positioning methodologies can be eliminated therey facilitating high-speed machining of the component 12.

As shown in FIG. 2, once the desired shape and configuration of the orthopaedic prosthetic component 12 has been achieved, the component 12 is removed from the EDM 14. In the case of when the EDM 14 is utilized to produce a net-shape orthopaedic prosthetic component 12, the process 50 ends. However, in the case of when the EDM 14 is used to produce a near net-shape orthopaedic prosthetic component 12, the component 12 is removed from the EDM 14 and the process 50 continues to step 62. In step 62, the near net-shape orthopaedic prosthetic component 12 is subjected to subsequent final machining. Such final machining may take the form of a polishing or fine grinding operation to create the desired final finish of the orthopaedic prosthetic component 12 (i.e., to produce the desired net-shape orthopaedic prosthetic component). Once this final machining is complete, the process 50 ends.

As described herein, the methods and systems of the present disclosure may be used to produce orthopaedic prosthetic components in relatively higher volumes utilizing a technique (i.e., electrical discharge machining) that typically could only be used for relatively lower volumes of manufacturing. As a result, electrical discharge machining may be used to produce custom implants, whereas such a technique typically could only be used for lower volume, slower applications such as prototyping. For example, to produce a modular head component of a hip prosthesis or shoulder prosthesis utilizing electrical discharge machining would typically take several days to complete a single head component. To manufacture saleable custom implants with such throughput times is impractical. However, by utilizing the methods and systems disclosed herein, it has been found that such head components can be produced in as little as a few hours apiece. Indeed, in one case, a head component was produced in eight hours. Such an improvement in throughput times has enabled the use of electrical discharge machining in the manufacture of saleable custom implants.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method and system described herein. It will be noted that alternative embodiments of the method and system of the present disclosure may not include all of the features described yet still benefit from at least some of the advantages of such features. Those of ordinary skill in the art may readily devise their own implementations of the method and system that incorporate one or more of the features of the present invention and fall within the spirit and scope of the present disclosure as defined by the appended claims.

The invention claimed is:

1. A method for fabricating an orthopaedic prosthetic component, the method comprising:
rotating the orthopaedic prosthetic component at a speed greater than about 100 revolutions-per-minute;
operating an electrical discharge machining tool to move a wire electrode of the electrical discharge machining tool along an arcuate path; and
generating a spark between the wire electrode and the orthopaedic prosthetic component to remove a portion of the orthopaedic prosthetic component.

2. The method of claim 1, wherein rotating the orthopaedic prosthetic component comprises rotating the orthopaedic prosthetic component at a speed of about 200 revolutions-per-minute.

3. The method of claim 1, wherein:
rotating the orthopaedic prosthetic component comprises rotating the orthopaedic prosthetic component in a first plane, and
operating the electrical discharge machining tool comprises operating the electrical discharge machining tool to move the wire electrode of the electrical discharge machining tool along an arcuate path defined in a second plane substantially orthogonal to the first plane.

4. The method of claim 1, further comprising advancing the wire electrode along the arcuate path without adaptive feedback relating to the rotary speed of the orthopaedic prosthetic component.

5. The method of claim 1, further comprising lathing the orthopaedic prosthetic component prior to the rotating step.

6. The method of claim 1, wherein the orthopaedic prosthetic component is a modular head component of a hip prosthesis.

7. The method of claim 1, wherein the orthopaedic prosthetic component is a modular head component of a shoulder prosthesis.

8. The method of claim 1, wherein generating the spark between the wire electrode and the orthopaedic prosthetic component comprises generating the spark between the wire electrode and the orthopaedic prosthetic component to form a curved surface of the orthopaedic prosthetic component.

9. The method of claim 8, wherein generating the spark between the wire electrode and the orthopaedic prosthetic component comprises generating the spark between the wire electrode and the orthopaedic prosthetic component to form a substantially spherical outer surface of the orthopaedic prosthetic component.

10. A method for fabricating an orthopaedic prosthetic component, the method comprising:
rotating the orthopaedic prosthetic component; and
operating an electrical discharge machining tool to (i) advance a wire electrode of the electrical discharge machining tool along an arcuate path without adaptive feedback relating to the rotary speed of the orthopaedic prosthetic component, and (ii) generate a spark between the wire electrode and the orthopaedic prosthetic component to remove a portion of the orthopaedic prosthetic component.

11. The method of claim 10, wherein rotating the orthopaedic prosthetic component comprises rotating the orthopaedic prosthetic component at a speed of about 200 revolutions-per-minute.

12. The method of claim 10, wherein:
rotating the orthopaedic prosthetic component comprises rotating the orthopaedic prosthetic component in a first plane, and
operating the electrical discharge machining tool comprises operating the electrical discharge machining tool to move the wire electrode along an arcuate path defined in a second plane substantially orthogonal to the first plane.

13. The method of claim 10, further comprising lathing the orthopaedic prosthetic component prior to the rotating step.

14. The method of claim 10, wherein the orthopaedic prosthetic component, is a modular head component of a hip prosthesis.

15. The method of claim 10, wherein the orthopaedic prosthetic component is a modular head component of a shoulder prosthesis.

16. The method of claim 10, operating the electrical discharge machining tool comprises operating the electrical discharge machining tool to generate the spark between the wire electrode and the orthopaedic prosthetic component to form a curved surface of the orthopaedic prosthetic component.

17. The method of claim 16, operating the electrical discharge machining tool comprises operating the electrical discharge machining tool to generate the spark between the wire electrode and the orthopaedic prosthetic component to form a substantially spherical outer surface of the orthopaedic prosthetic component.

18. A system for fabricating an orthopaedic prosthetic component, the system comprising:
an electrical discharge machining tool, and
a motor including a mechanism configured to secure the orthopaedic prosthetic component, the motor being configured to rotate the orthopaedic prosthetic component relative to the electric discharge machine tool at a speed greater than about 100 revolutions-per-minute,
wherein the electrical discharge machining tool is configured to advance a wire electrode of the electrical discharge machining tool along an arcuate path without adaptive feedback relating to the rotary speed of the orthopaedic prosthetic component.

19. The system of claim 18, wherein the motor is configured to rotate the orthopaedic prosthetic component at a speed of about 200 revolutions-per-minute.

* * * * *